US008610833B2

(12) United States Patent
Posamentier

(10) Patent No.: US 8,610,833 B2
(45) Date of Patent: Dec. 17, 2013

(54) CHANNEL CONTROL TECHNIQUES

(75) Inventor: Joshua D. Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/459,484

(22) Filed: Apr. 30, 2012

(65) Prior Publication Data

US 2012/0212677 A1 Aug. 23, 2012

Related U.S. Application Data

(62) Division of application No. 11/590,216, filed on Oct. 31, 2006, now Pat. No. 8,189,119.

(51) Int. Cl.
*H04N 5/50* (2006.01)
*H04N 5/44* (2011.01)

(52) U.S. Cl.
USPC .......................................... 348/731; 348/725

(58) Field of Classification Search
USPC ........ 348/731–733, 735, 725; 725/37, 14, 38, 725/100, 131, 133, 139, 141, 151, 153; 334/8; 455/179.1, 181.1, 182.1, 192.1, 455/226.1, 230, 255, 258, 323
IPC ................................................ H04N 5/50,5/44
See application file for complete search history.

(56) References Cited

U.S. PATENT DOCUMENTS

| | | | | |
|---|---|---|---|---|
| 4,825,214 | A * | 4/1989 | Dejaegher | 342/128 |
| 5,510,859 | A * | 4/1996 | Douglass et al. | 348/731 |
| 7,816,926 | B2 * | 10/2010 | Benedikt et al. | 324/637 |
| 2003/0194984 | A1 * | 10/2003 | Toncich et al. | 455/323 |
| 2004/0068737 | A1 | 4/2004 | Itoh et al. | |
| 2007/0064160 | A1 | 3/2007 | Tanaka et al. | |

* cited by examiner

*Primary Examiner* — Sherrie Hsia
(74) *Attorney, Agent, or Firm* — Kacvinsky Daisak PLLC

(57) ABSTRACT

Techniques involving the reception of content are disclosed. For example, an apparatus may include a tuning detection module, a channel selection module, and a remote tuning module. The tuning detection module determines a local tuning of a user device. This determination may be made from a leakage signal (e.g., local oscillator (LO) leakage) generated by the user device. Based on the determined local tuning, the channel selection module selects an output channel from a remote digital tuner. The output channel may then be tuned by the remote tuning module for reception by the user device at its local tuning.

17 Claims, 5 Drawing Sheets

200

300

400

500

CHANNEL CONTROL TECHNIQUES

BACKGROUND

User devices are capable of receiving content in various forms, such as video, audio, games, data, multimedia, and so forth. This reception may involve arrangements of various parts and components (e.g., antennas, cable interfaces, digital tuners, etc.) to receive and process content-bearing signals from a communications medium. Further, such arrangements may include reception components within user devices to accept and render the processed content-bearing signals to a user.

Each part in a reception arrangement may require an individual tuning or setting. For instance, a particular tuning at a user device may require a corresponding selection and tuning of other elements involved in the reception of content. Currently, there is a lack of coordination in establishing such tunings or settings among multiple elements.

DETAILED DESCRIPTION

Various embodiments may be generally directed to techniques involving the reception of content. For instance, in embodiments, an apparatus may include a tuning detection module, a channel selection module, and a remote tuning module. The tuning detection module determines a local tuning of a user device. This determination may be made from a leakage signal (e.g., a local oscillator (LO) leakage) generated by the user device. Based on the determined local tuning, the channel selection module selects an output channel from a remote tuner (e.g., a remote digital tuner). The output channel may then be tuned by the remote tuning module for reception by the user device at its local tuning.

As described herein, embodiments may advantageously provide automatic configuration for the reception of a local tuning or selection. By isolating and amplifying the local tuner's local oscillator (LO) leakage, the local tuning may be determined. Based on this determination, the remote source (e.g., a tuner associated with a digital cable system, digital broadcast satellite system, etc.) may be digitally controlled and/or tuned to produce the locally tuned selection (e.g., on a television, VCR, digital video recorder, etc.). Also, the produced channel may be placed (e.g., RF modulated, downconverted, and/or mixed) onto the appropriate channel for reception by the local tuner at its local receiver, which would be tuned to the requested channel. Thus, by simply changing the channel on a television or other local tuner, a channel from a remote digital tuner may be selected and/or processed.

Embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
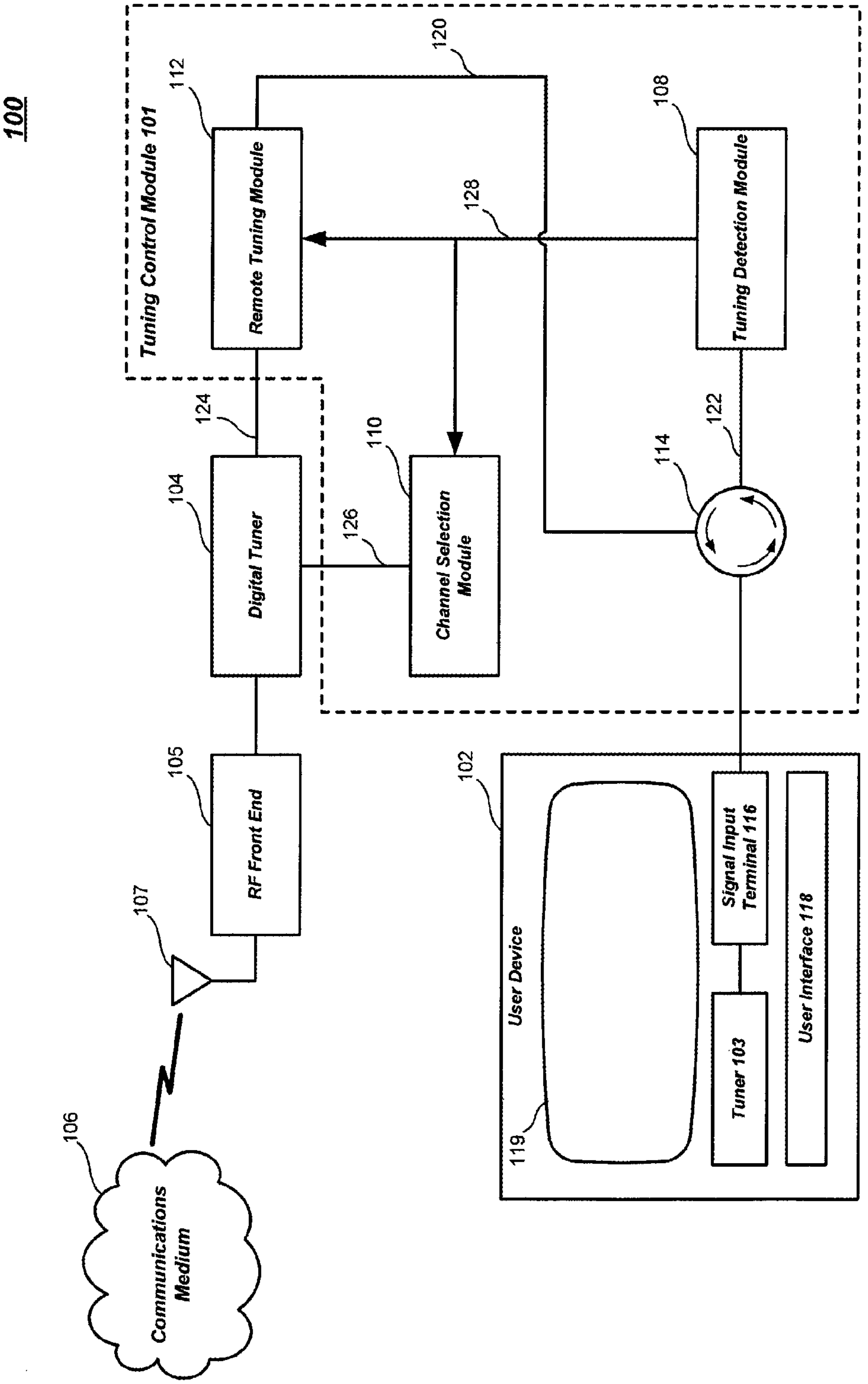
FIG. 1 illustrates one embodiment of a system.

FIG. 1 illustrates one embodiment of a system that may deliver content to a user device. In particular, FIG. 1 shows a system 100 comprising various elements. The embodiments, however, are not limited to these depicted elements. As shown in FIG. 1, system 100 may include a user device 102, a remote tuner 104, a communications medium 106, a tuning detection module 108, a channel selection module 110, a remote tuning module 112, and a routing node 114. These elements may be implemented in hardware, software, firmware, or any combination thereof.

User device 102 may receive content signals. For purposes of illustration, FIG. 1 shows user device 102 as a device capable of receiving video signals and displaying corresponding images on a display 119. These video signals may be analog, such as NTSC, PAL, and/or SECAM signals. However, the embodiments are not limited to this context. For instance, such video signals may be digital. Accordingly, user device 102 may be a television device, or a computing platform such as a multimedia personal computer (PC). In addition, user device 102 may be a mobile communications device, such as a cellular telephone, smart phone, or personal digital assistant (PDA). The embodiments, however, are not limited to this context.

Alternatively or additionally, user device 102 may receive audio signals. Examples of such signals include frequency modulated (FM) and/or amplitude modulated (AM) broadcast radio signals. Moreover, other types of content signals (either analog or digital) may be received by user device 102.

FIG. 1 shows that, user device 102 includes a signal input terminal 116, which is coupled to routing node 114. Signal input terminal 116 may connect to a signal conveying medium, such as a coaxial cable. Thus, signal input terminal 116 may include a connector to receive a content signal 120 through this medium. As described above, content signal 120 may be in various formats. Exemplary formats include ATSC, PAL, NTSC, and/or SECAM video formats. However, the embodiments are not limited to these examples. For instance, content signal 120 may be in digital formats, as well as in non-video formats and data formats.

Within user device 102, signal input terminal 116 may direct content signal 120 to a tuner 103. Based on a user selection, tuner 103 may be tuned to a particular frequency channel. This tuning is also referred to herein as a local tuning of user device 102.

The user's tuning selection may be made through a user interface 118. As shown in FIG. 1, user interface 118 may be within user device 102 (e.g., a keypad, keyboard, button(s), etc.). Alternatively, user interface 118 may be a separate device, such as a remote control, that provides user device 102 with tuning directives.

In addition to receiving content signals, signal input terminal 116 may output signals. For instance, signal input terminal 116 may output a leakage signal 122. This leakage signal may be attributed to a local oscillator within user device 102. Accordingly, such a leakage signal is referred to as a local oscillator (LO) leakage signal.

The frequency of leakage signal 122 may indicate the frequency of a tuned oscillator within a receiver (e.g., tuner 103) of user device 102. Thus, by identifying the frequency of leakage signal 122, the tuning of user device 102 may be determined.

FIG. 1 shows that tuning detection module 108, channel selection module 110, remote tuning module 112, and routing node 114 may be included in a tuning control module 101. However, in embodiments, tuning control module 101 may include greater or fewer elements, as well as other couplings between elements.

Routing node 114 forwards content signal 120 from remote tuning module 112 to signal input terminal 116. Also, routing node 114 forwards leakage signal 122 from signal input terminal 116 to tuning detection module 108. As shown in FIG. 1, routing node 114 may be implemented with a circulator. However, other implementations may be employed.

The generation of content signal 120 is now described. Remote tuner 104 receives content-bearing signals from a communications medium 106. As indicated by a radio frequency (RF) front end 105 and an antenna 107, communications medium 106 may be wireless. Exemplary wireless communications media include Digital Video Broadcasting (DVB), Direct Broadcast Satellite (DBS), conventional television and/or radio broadcast systems, wireless data networks (e.g., WLANs, WiFi, WiMax, etc.), cellular networks, and so forth. Alternatively, communications medium 106 may be wired. Examples of wired communications media include cable systems, such as cable television (CATV), and Data over Cable Service Specification (DOCSIS) networks. Moreover, communications medium 106 may comprise data networks, such as the Internet. The embodiments, however, are not limited to such examples.

Signals received by remote tuner 104 may be digitally modulated or encoded. Thus, remote tuner 104 may be a digital tuner. Moreover, these signals may convey multiple transmission streams. However, remote tuner 104 may decode and output selected transmission stream(s) as an output signal 124. Selection of transmission stream(s) may be determined by a control signal 126. As shown in FIG. 1, remote tuner 104 may receive control signal 126 from channel selection module 110. Channel selection module 110 selects a channel for decoding and output by remote tuner 104. This selection (which is conveyed in control signal 126) may be based on a local tuning of user device 102.

Output signal 124 may be in an analog format. Also, output signal 124 may be at an intermediate frequency (IF). In the context of video signals, examples of analog formats include NTSC, PAL, and SECAM formats. However, output signal 124 may alternatively be in a digital format.

FIG. 1 shows that remote tuning module 112 receives output signal 124 for processing into content signal 120. More particularly, remote tuning module 112 may downconvert output signal 124 to an appropriate frequency for reception by user device 102 at its local tuning as content signal 120. As described above, content signal 120 is sent to user device 102 via routing node 114.

Tuning detection module 108 determines a local tuning of user device 102. Based on this determination, tuning detection module 108 generates a tuning indicator 128, which is sent to channel selection module 110 and remote tuning module 112. Tuning detection module 108 may determine the local tuning from a signal emitted by user device 102. This signal may be, for example, leakage signal 122. As described above, tuning detection module 108 receives leakage signal 122 from user device 102 via routing node 114.

Figure 2:
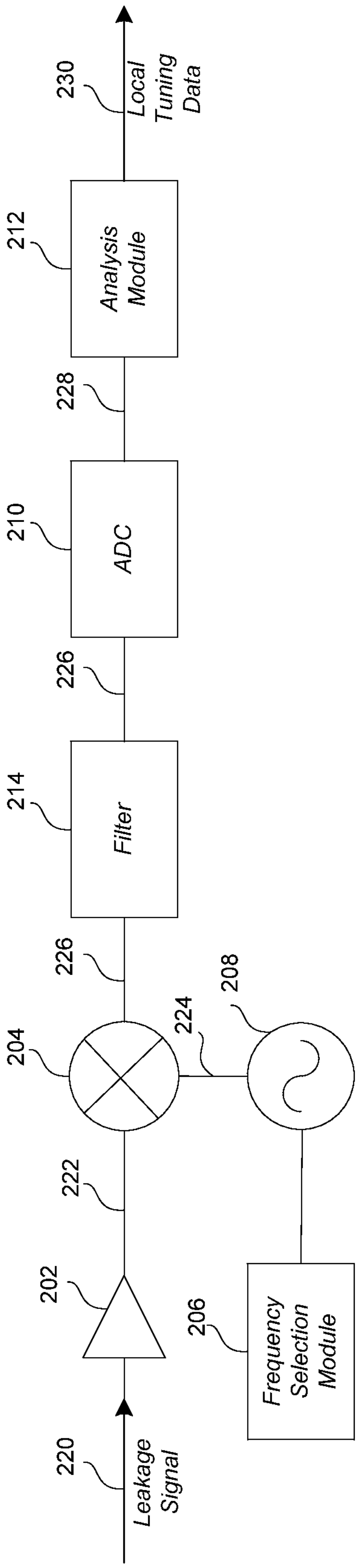
FIG. 2 illustrates an exemplary implementation embodiment that may be included within a tuning detection module.

FIG. 2 is a diagram of an implementation 200 that may be employed in tuning detection module 108. Implementation 200 may include various elements. For instance, FIG. 2 shows implementation 200 including an amplifier 202, a mixer 204, a frequency selection module 206, an oscillator 208, an analog to digital converter (ADC) 210, and an analysis module 212. These elements may be implemented in hardware, software, firmware, or any combination thereof.

Amplifier 202 receives and amplifies an input signal 220. With reference to FIG. 1, input signal 220 may be leakage signal 122. As shown in FIG. 2, amplifier 202 produces a signal 222, which is sent to mixer 204. Amplifier 202 may be a low noise amplifier (LNA). However, other types of amplifiers may be employed. Frequency selection module 206 selects frequencies for generation by oscillator 208. Based on such selections, oscillator 208 produces a waveform signal 224.

As shown in FIG. 2, mixer 204 receives signal 222 and waveform signal 224. From these signals, mixer 204 generates an indicator signal 226. Indicator signal 226 includes a component corresponding to signal 222, which is shifted in frequency by the frequency of waveform signal 224. In various embodiments, implementation 200 may include one or more filters 214 to isolate this corresponding component from other components within indicator signal 226.

Frequency selection module 206 may select a predetermined constant frequency for generation by oscillator 208. As stated above, indicator signal 226 will have a component that corresponds to signal 222. Thus, the frequency of signal 222 may be identified by a computation e.g., a sum or difference calculation) between the frequency of this component and the predetermined constant frequency.

Alternatively, frequency selection module 206 may select multiple frequencies for generation by oscillator 208. For instance, frequency selection module 206 may cause oscillator 208 to generate waveform signal 224 such that it varies in frequency over a predetermined period of time. This frequency variation may be according to, for example, a predetermined frequency sequence or a time varying frequency function.

In such alternatives, when the indicator signal 226 component corresponding to signal 222 is at baseband, waveform signal 224 has a frequency that substantially matches the frequency of signal 222. Thus, the frequency of signal 222 may be identified by knowing the frequency of waveform signal 224 when it generated the indicator signal component at baseband.

Thus, indicator signal 226 may be analyzed to determine the frequency of signal 222. In the context of FIG. 1, this frequency is the frequency of leakage signal 122. As described herein, such a frequency may correspond to a local tuning of a user device.

Analysis of indicator signal 226 may be performed by analysis module 212. As shown in FIG. 2, analysis module 212 may receive a digital representation 228 of indicator signal 226 that was generated by ADC 210. Alternatively, analysis module 212 may receive indicator signal 226 (or a corresponding analog signal) directly.

Upon receipt of digital representation 228, analysis module 212 identifies the frequency of signal 222. This may involve performing various signal processing operations. For instance, analysis module 212 may perform one or more transforms to extract the spectral characteristics of signal 222. Exemplary transforms include, but are not limited to, discrete fourier transforms (DFTs) (e.g., fast fourier transforms (FFTs)), and discrete cosine transforms (DCTs).

Further, analysis module 212 may perform peak detection operation(s) to identify prominent frequency component(s). Such prominent frequency components may identify the frequency of an oscillator leak signal, such as leak signal 122.

From such operations, analysis module 212 generates local tuning data 230. Local tuning data 230 indicates the local tuning (e.g., a frequency channel). In the context of FIG. 1, local tuning data 230 may be sent (as tuning indicator 128) to channel selection module 110 and remote tuning module 112.

Figure 3:
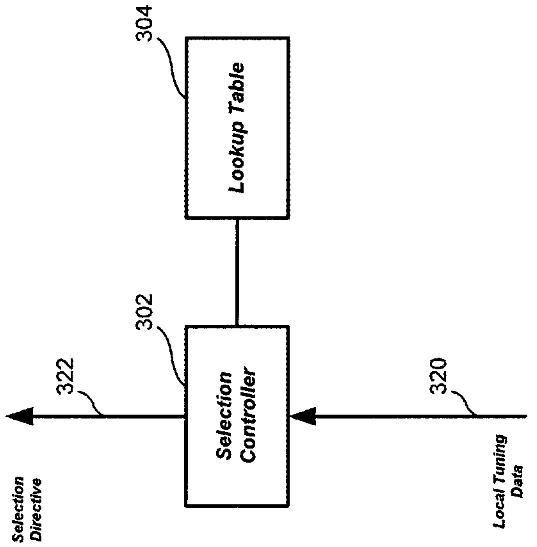
FIG. 3 illustrates an exemplary implementation embodiment that may be included within a channel selection module.

FIG. 3 is a diagram of an implementation 300 that may be employed in channel selection module 110. Implementation 300 includes a selection controller 302 and a look-up table (LUT) 304. These elements may be implemented in hardware, software, firmware, or any combination thereof.

As shown in FIG. 3, selection controller 302 receives local tuning data 320 (e.g., tuning indicator 128 of FIG. 1) and generates a selection directive 322. In the context of FIG. 1, selection directive 322 may be sent to remote tuner 104 as control signal 126.

LUT 304 may comprise a storage medium (e.g., memory) that stores one or more correspondences between local tunings and output channels for a remote tuner. Based on local tuning data 320, selection controller 302 may select an output channel for selection directive 322 from these correspondences. More particularly, to generate selection directive 322, selection controller 302 may access LUT 304 based on an index or address corresponding to local tuning data 320.

Figure 4:
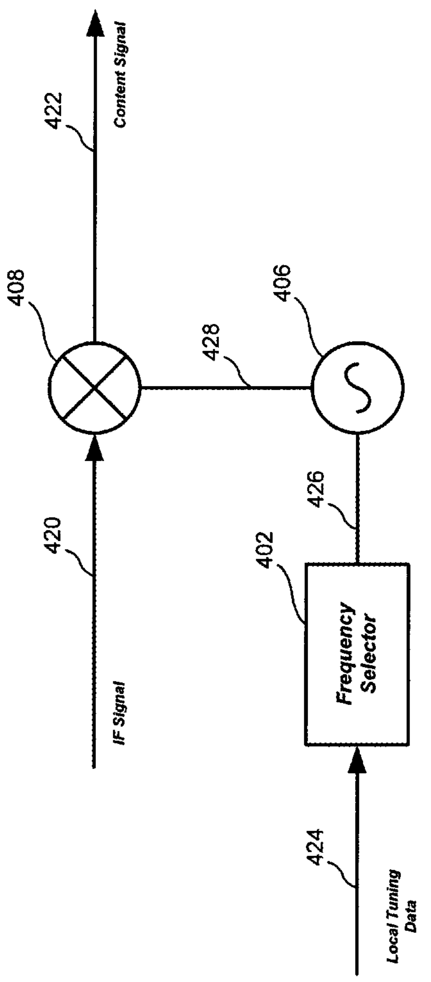
FIG. 4 illustrates an exemplary implementation embodiment that may be included within a remote tuning module.

FIG. 4 is a diagram of an implementation 400 that may be employed, for example, in remote tuning module 112. Implementation 400 may include a frequency selector 402, an oscillator 406, and a mixer 408. These elements may be implemented in hardware, software, firmware, or any combination thereof.

FIG. 4 shows that mixer 408 generates a content signal 422 from an intermediate frequency (IF) signal 420 and an oscillator waveform 428. In the context of FIG. 1, content signal 422 may be sent to user device 102 (via routing node 114) as content signal 120. Oscillator waveform 428 may have a frequency that is set to the tuning of a local user device, such as user device 102. As shown in FIG. 4, this frequency is established by frequency selector 402 based on received local tuning data 424. In the context of FIG. 1, local tuning data 424 may be implemented as tuning indicator 128. From this, frequency selector 402 generates a frequency directive 426, which is sent to oscillator 406.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 5:
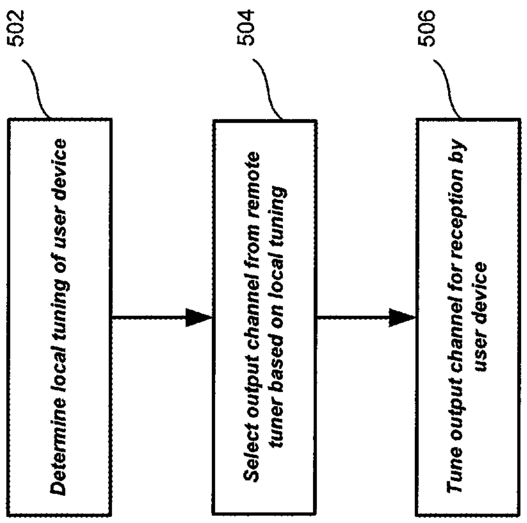
FIG. 5 illustrates one embodiment of a logic diagram.

FIG. 5 illustrates one embodiment of a logic flow. In particular, FIG. 5 illustrates a logic flow 500, which may be representative of the operations executed by one or more embodiments described herein. As shown in logic flow 500, a block 502 determines a local tuning of a user device. This may involve receiving, processing, and analyzing a leakage signal from the user device. With reference to FIG. 1, this block may be implemented with tuning detection module 108.

A block 504 selects an output channel from a remote digital tuner based on the determined local tuning of the user device. Referring to FIG. 1, channel selection module 110 may implement this selection.

A block 506 tunes the output channel for reception by the user device at the determined local tuning. This tuning may be implemented by remote tuning module 112 of FIG. 1.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
- an oscillator to generate a waveform signal;
- a mixer to generate an indicator signal based on the waveform signal and a leakage signal received from a user device; and
- an analysis module to identify a local tuning of the user device from the indicator signal, and to perform peak detection operations to identify prominent frequency components of the indicator signal.

2. The apparatus of claim 1, comprising a frequency selection module to cause the oscillator to generate the waveform signal according to a constant frequency.

3. The apparatus of claim 1, comprising a frequency selection module to cause the oscillator to generate the waveform signal such that it varies in frequency according to a time varying frequency sequence.

4. The apparatus of claim 1, comprising an amplifier to amplify the leakage signal, the mixer to generate the indicator signal based on the waveform signal and the amplified leakage signal.

5. The apparatus of claim 4, comprising one or more filters to isolate a component corresponding to the amplified leakage signal from the waveform signal within the indicator signal.

6. The apparatus of claim 1, the analysis module to perform one or more transforms to extract spectral characteristics of the indicator signal.

7. A system, comprising:
- a display;
- a tuning detection module coupled to the display, comprising:
  - an oscillator to generate a waveform signal;
  - a frequency selection module to cause the oscillator to generate the waveform signal according to one or more frequencies;
  - a mixer to generate an indicator signal based on the waveform signal and a leakage signal received from a user device; and
  - an analysis module to identify a local tuning of the user device from the indicator signal, and to perform peak detection operations to identify prominent frequency components of the indicator signal.

8. The system of claim 7, frequency selection module to cause the oscillator to generate the waveform signal such that it varies in frequency according to a time varying frequency sequence.

9. The system of claim 7, the tuning detection module comprising an amplifier to amplify the leakage signal, the mixer to generate the indicator signal based on the waveform signal and the amplified leakage signal.

10. The system of claim 9, the tuning detection module comprising one or more filters to isolate a component corresponding to the amplified leakage signal from the waveform signal within the indicator signal.

11. The system of claim 7, the analysis module to perform one or more transforms to extract spectral characteristics of the indicator signal.

12. A method, comprising:
- generating a waveform signal;
- generating an indicator signal based on the waveform signal and a leakage signal received from a user device;
- identifying a local tuning of the user device from the indicator signal; and
- performing peak detection operations to identify prominent frequency components of the indicator signal.

13. The method of claim 12, comprising generating the waveform signal according to a constant frequency.

14. The method of claim 12, comprising generating the waveform signal such that it varies in frequency according to a time varying frequency sequence.

15. The method of claim 12, comprising:
- amplifying the leakage signal, and
- generating the indicator signal based on the waveform signal and the amplified leakage signal.

16. The method of claim 15, comprising isolating a component corresponding to the amplified leakage signal from the waveform signal within the indicator signal.

17. The method of claim 12, comprising performing one or more transforms to extract spectral characteristics of the indicator signal.

* * * * *

UNITED STATES PATENT AND TRADEMARK OFFICE

CERTIFICATE OF CORRECTION

PATENT NO. : 8,610,833 B2
APPLICATION NO. : 13/459484
DATED : December 17, 2013
INVENTOR(S) : Joshua D. Posamentier It is certified that error appears in the above-identified patent and that said Letters Patent is hereby corrected as shown below:

In the Claims

In column 8, line 17, in claim 8, delete “frequency” and insert -- the frequency --, therefor.

Signed and Sealed this
Fourteenth Day of October, 2014

Michelle K. Lee

Michelle K. Lee
*Deputy Director of the United States Patent and Trademark Office*